United States Patent [19]
Knopp

[11] Patent Number: 5,582,155
[45] Date of Patent: Dec. 10, 1996

[54] COMBUSTION ENGINE WITH SIDE PORTS

[75] Inventor: Donald F. Knopp, Sheridan, Colo.

[73] Assignee: Knopp's Auto Repair, Inc., Denver, Colo.

[21] Appl. No.: 284,262

[22] Filed: Aug. 1, 1994

[51] Int. Cl.$^6$ .................................................. F02B 47/08
[52] U.S. Cl. ...................... 123/568; 123/25 C; 123/25 D; 123/25 E
[58] Field of Search ............................... 123/25 C, 25 D, 123/25 F, 25 P, 568, 316, 65 PE

[56] References Cited

U.S. PATENT DOCUMENTS

| | | | |
|---|---|---|---|
| 704,995 | 7/1902 | Weiss | 123/25 C |
| 1,148,577 | 8/1915 | Crossen | 123/25 C |
| 1,384,133 | 7/1921 | Howe | 123/316 |
| 1,722,951 | 7/1929 | Barkeij | 123/316 |
| 3,139,873 | 7/1964 | Gardner | 123/119 |
| 3,908,613 | 9/1975 | Loby | 123/25 C |
| 4,070,998 | 1/1978 | Grow | 123/26 |
| 4,094,288 | 6/1978 | Davis | 123/127 |
| 4,149,493 | 4/1979 | Franke | 123/26 |
| 4,176,632 | 12/1979 | Franke | 123/25 C |
| 4,191,134 | 3/1980 | Goodman | 123/25 J |
| 4,237,826 | 12/1980 | Motosugi et al. | 123/25 R |
| 4,281,626 | 8/1981 | Fishe | 123/25 C |
| 4,300,483 | 11/1981 | Goodman | 123/25 J |
| 4,408,573 | 10/1983 | Schlueter et al. | 123/25 P |
| 4,637,352 | 1/1987 | Green | 123/25 P |
| 4,945,868 | 8/1990 | Klomp | 123/65 PE |
| 4,986,223 | 1/1991 | Mahoney | 123/25 B |
| 5,115,790 | 5/1992 | Kawamura | 123/568 |
| 5,127,372 | 7/1992 | Fujimoto et al. | 123/65 PE |
| 5,357,919 | 10/1994 | Ma | 123/568 |

FOREIGN PATENT DOCUMENTS

| | | | |
|---|---|---|---|
| 2509792 | 1/1983 | France | 123/65 PE |
| 1016545 | 5/1983 | U.S.S.R. | 123/65 PE |

*Primary Examiner*—Erick R. Sous
*Attorney, Agent, or Firm*—Ross, P.C. Sheridan

[57] ABSTRACT

A combustion engine having a combustion chamber with a side port in a sidewall thereof interconnecting the combustion chamber with a side manifold. The side port is positioned between about 25% and about 75% of the stroke length from the bottom dead center position of the pistons. The engine includes a fluid injection system which provides an alcohol-water mixture to the side manifold to maintain the manifold at an elevated pressure. The pressure manifold is heated to provide for expansion of the fluids provided thereto and is readily removable to allow for normal functioning of the engine.

31 Claims, 8 Drawing Sheets

COMBUSTION ENGINE WITH SIDE PORTS

FIELD OF THE INVENTION

The present invention generally relates to the field of combustion engines, such as four-stroke automotive engines. More particularly, the present invention relates to a combustion engine having a port in a sidewall of the combustion chamber in combination with other features to enhance one or more performance characteristics of the engine.

BACKGROUND OF THE INVENTION

Internal combustion engines are widely utilized as a means of extracting power from fuel sources. For example, four-stroke piston engines are commonly utilized to combust fossil fuels and generate power from expanding gases to propel automobiles.

Various attempts have been made to improve the performance of internal combustion engines. For example, attempts have been made to reduce pollution emissions, such as unburned hydrocarbons, carbon monoxide, and nitrogen oxides, by recirculating exhaust gases back to the engine for recombustion. Further, steam injection has been utilized to decrease pollutants and to improve efficiency and performance of internal combustion engines. In addition, pre-compression of intake gases, such as by using turbochargers and superchargers, has been utilized to increase the power output of combustion engines.

Each of the above-noted attempts at improving engine performance has met with some success; however, many of the corresponding designs are expensive to install, are bulky, have many moving parts, and can require frequent maintenance and repairs. For example, some designs require a plurality of conduits to route exhaust gases and/or compressed gas. In addition, many require expensive high-speed blowers or compressors to compress the gases. Some require complicated cam and valve arrangements to precisely time the introduction of steam and/or compressed gases. Further, some utilize an external heat source to pre-heat the gas and/or steam prior to introduction into the engine.

Accordingly, it is an object of the present invention to provide a combustion engine having improved performance characteristics. It is a related object to provide a combustion engine having improved power output, enhanced fuel economy, and/or decreased pollution emissions.

It is another object of the present invention to provide a device which performs at least one of the above-noted functions and which can be installed on an existing combustion engine without extensive modifications to the engine.

SUMMARY OF THE INVENTION

In accordance with the present invention, a combustion engine is provided which accomplishes one or more of the above-noted objects. The engine generally comprises an engine block defining a combustion chamber having a side port in a side wall thereof, a movable member (e.g., a piston) movable relative to and within the combustion chamber to intermittently cover and uncover the side port, and a hollow member (e.g., a pressure manifold) positioned adjacent the engine block and defining a pressure chamber. An interconnect means is provided for interconnecting the pressure chamber with the side port of the combustion chamber.

In one aspect of the present invention, the combustion engine further comprises means for providing expandable fluid to the pressure chamber. Upon entry into the pressure chamber, the expandable fluid will expand and pressurize the pressure chamber. For example, in one embodiment, the expandable fluid comprises water and/or steam and is expanded due to the provision of heat to the pressure chamber (e.g., by approximate location of the pressure chamber adjacent the combustion chamber). In another embodiment, the expandable fluid further comprises an alcohol (e.g., ethyl alcohol).

In another embodiment, the combustion engine comprises a piston-cylinder engine wherein the movable member comprises a piston and the combustion chamber comprises a cylinder. In this embodiment, the piston is movable relative to the cylinder from a bottom position to a top position, thereby defining a stroke length. Preferably, the side port is positioned between about 25% and about 75% of the stroke length from the bottom position. In another embodiment, the engine block defines at least two combustion chambers and the interconnect means interconnects the pressure chamber with each of the combustion chambers. Preferably, the combustion engine is a four-stroke engine. In yet another embodiment, the interconnect means comprises valve means for intermittently opening and closing the interconnect means.

In another aspect of the present invention, the combustion engine further comprises means for heating the pressure chamber. In one embodiment, such means for heating the pressure chamber comprises an exhaust duct positioned in heat transfer relationship to the pressure chamber. In another embodiment, the means for heating comprises positioning the pressure chamber in heat transfer relationship with the combustion chamber. Preferably, the means for heating the pressure chamber is capable of raising the temperature of the pressure chamber to at least about 300° F., and preferably at least about 1000° F., during at least a portion of the operation of the combustion engine.

In another aspect of the present invention, the engine block of the combustion engine defines at least two cylinders with at least two corresponding pistons positioned therein and movable relative thereto from a bottom position to a top position, thereby defining a stroke length. Each cylinder includes a corresponding side port positioned between about 25% and about 75% of the stroke length from the bottom position. Preferably, such positioning of the side ports is between about 35% and about 65% of the stroke length from the bottom position and, more preferably, is positioned about 50% of the stroke length from the bottom position. In one embodiment, each piston comprises a wrist pin positioned within an aperture in the piston and at least one end cap positioned within the aperture to effectively seal the wrist pin from the cylinder.

DETAILED DESCRIPTION

Figure 1:
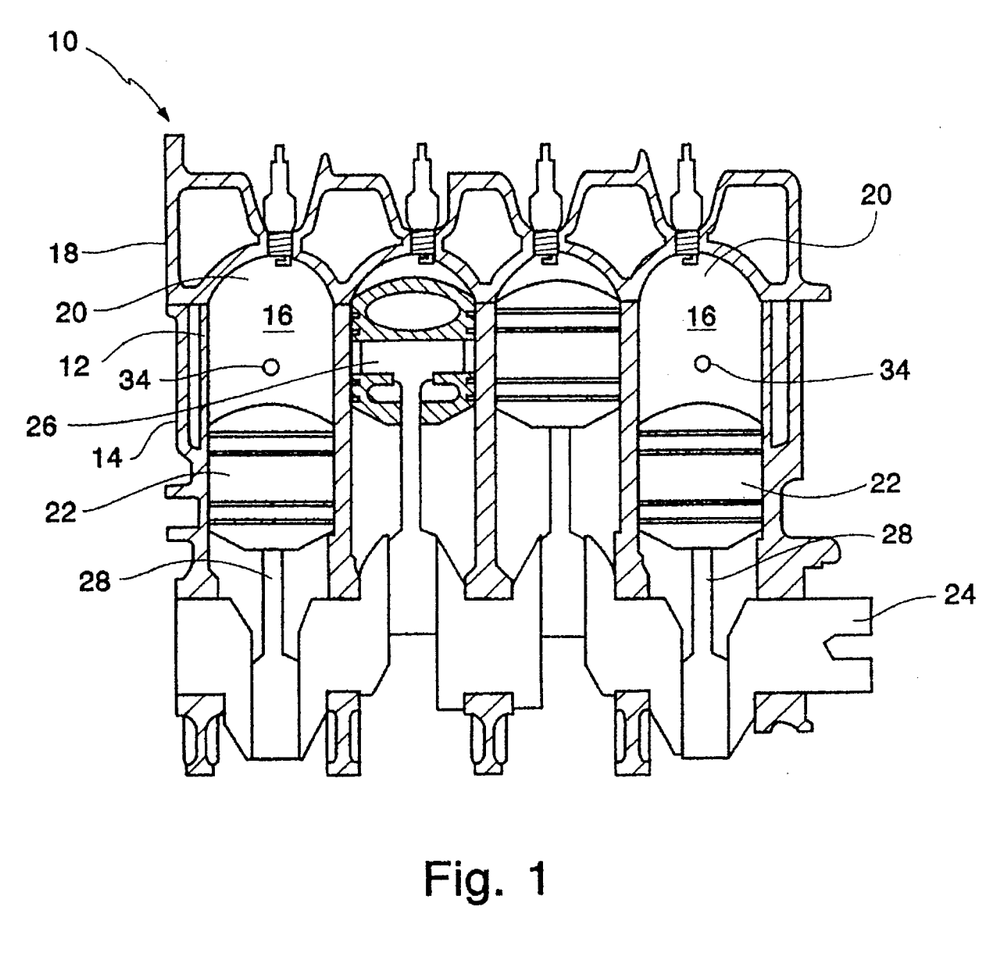
FIG. 1 is a side sectional view of a four-cylinder engine embodying the present invention.
Figure 2:
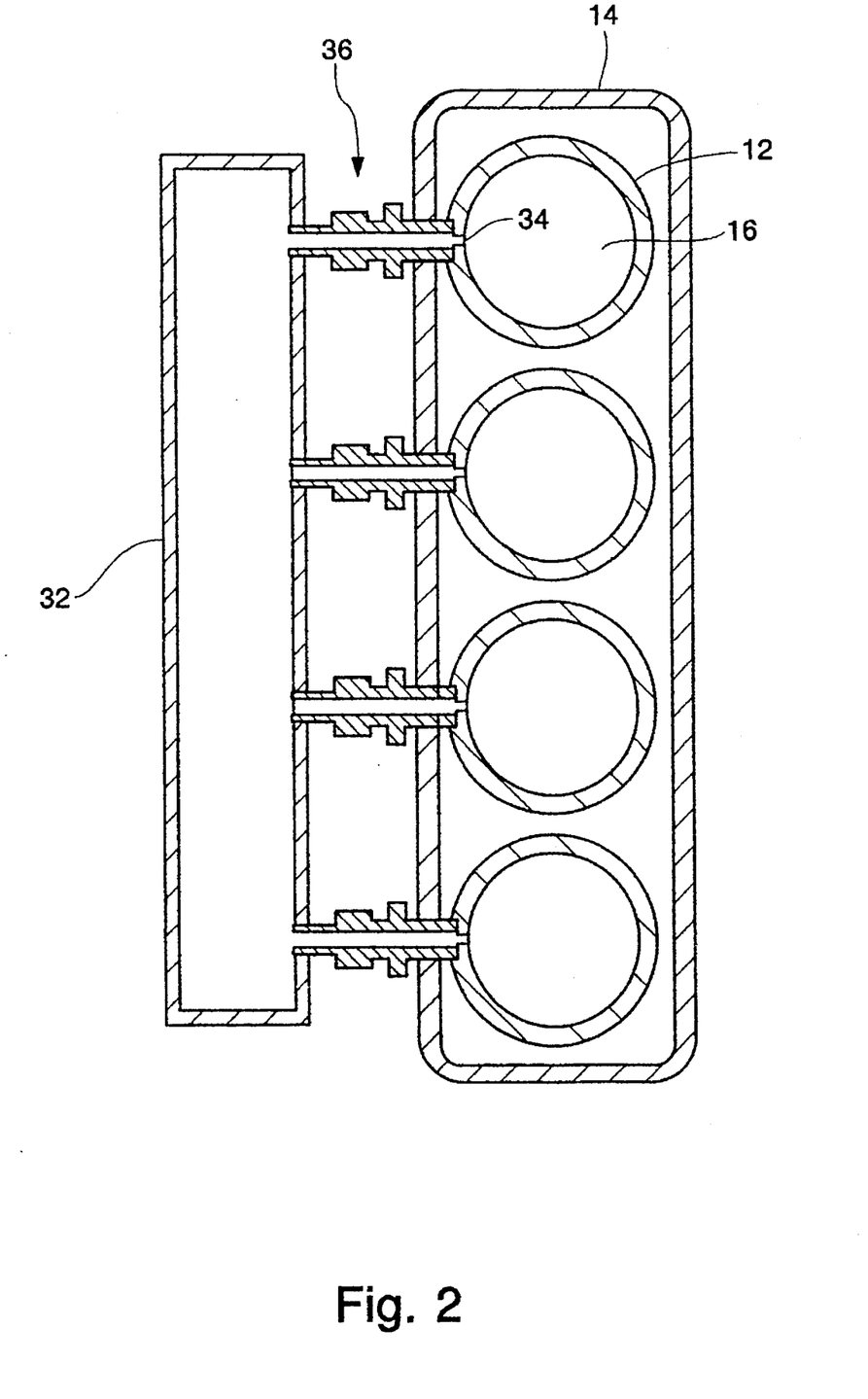
FIG. 2 is a top sectional view taken along line 2—2 in FIG. 1.

FIGS. 1–2 illustrate a four-cylinder, four-cycle internal combustion engine 10 embodying the features of the present invention. It should be appreciated that, although the described embodiment is a four-cylinder, four-cycle engine, the concepts of the present invention are also applicable to other types of engines (e.g., two-stroke, rotary, etc.).

Referring specifically to FIG. 1, the illustrated engine 10 generally comprises four cylinder liners 12 positioned in parallel relation to each other within an engine block 14. Each cylinder liner 12 defines the sides of a cylinder 16. An engine head 18 is secured to the top of the engine block 14 and includes a dome-shaped recess 20 positioned immediately above each cylinder liner 12 to define the top of the cylinder 16. Four pistons 22, one positioned within each cylinder 16, are interconnected with a crank shaft 24 via wrist pins 26, connecting rods 28 and bearings (not shown), as is known in the art.

In accordance with the present invention, as illustrated in FIG. 2, a side manifold 32 is positioned adjacent the engine block 14 and is interconnected with each cylinder 16 via side ports 34 in each corresponding cylinder liner 12. The manifold is a hollow cylindrical tube which is completely sealed except for four interconnect assemblies 36 connecting the interior of the manifold to each of the above-noted side ports 34 in each of the cylinder liner 12. In the illustrated embodiment, the manifold comprises cold rolled steel tubing having a 3/16 wall thickness, a 1½-inch outer diameter and a 14-inch length. The ends of the manifold are sealed, for example, by brazing a steel plug on each end. It should be appreciated that many other configurations and materials may be utilized in practicing the principles of the present invention.

The manifold 32 is horizontally positioned adjacent the engine block 14 at approximately the mid-portion of the cylinder liner 12. In the illustrated embodiment, the outside edge of the manifold is positioned approximately two inches from the outside edge of the cylinder liner 12. Such close positioning of the manifold to the cylinder liner 12 provides good heat transfer from the cylinder liners 12 to the manifold, the importance of which is described below in more detail.

Figure 3:
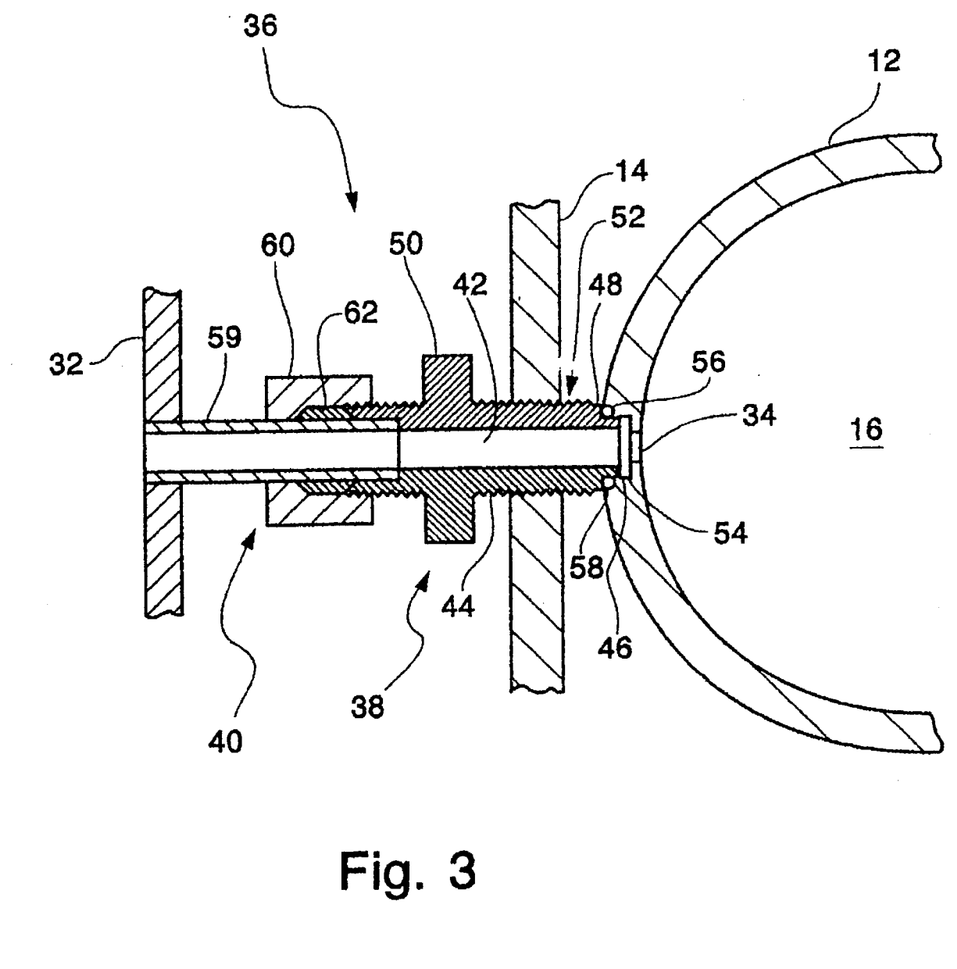
FIG. 3 is an enlarged sectional view of an interconnect assembly shown in FIG. 2.

An enlarged view of a single interconnect assembly 36 is illustrated in FIG. 3. In the illustrated embodiment, the interconnect assembly 36 comprises a first interconnect member 38 threaded into the engine block 14 and a second interconnect member 40 secured to the side manifold 32. The first interconnect member 38 has a ¼-inch orifice 42 extending therethrough and comprises a threaded portion 44 having a ½-inch outer diameter and a reduced portion 46 having a ⅜-inch outer diameter. The difference in diameters between the threaded portion 44 and the reduced portion 46 forms a shoulder 48. A hexagonal nut portion 50 is secured to the threaded portion 44 to thereby provide a means for rotating the threaded portion 44 into the engine block 14.

The engine block 14 includes a threaded orifice 52 for receiving the threaded portion 44 of the first interconnect member 38. The cylinder liner 12 includes a 7/16-inch orifice 54 extending partially therethrough and a 3/16-inch side port 34 extending complete therethrough, thereby forming a stepped orifice. The outside edge of the 7/16-inch orifice 54 is chamfered to provide a chamfered surface 56 against which an O-ring gasket 58 can be positioned to provide a seal. The gasket 58 is made from a high-temperature material, such as copper or special rubber, and is preferably Viton, a trademark of E.I. Du Pont de Nemours & Co.

In operation, the first interconnect member 38 is threaded into the engine block 14 until the shoulder 48 contacts the gasket 58. Further rotation of the hexagonal nut portion 50 causes deformation of the gasket 58 between the shoulder 48 and the chamfer to provide a seal between the first interconnect member 38 and the engine block 14. The first interconnect member 38 is torqued to about 12–18 foot-pounds.

The second interconnect member 40 comprises a tubular member 59 secured to the side manifold 32, for example, by brazing to provide fluid communication between the interior of the side manifold 32 and the interior of the second interconnect member 40. The second interconnect member 40 has an inner diameter of about ¼-inch and an outer diameter of about ⅜-inch. The second interconnect member 40 is insertable within the interior of the first interconnect member 38 and is secured thereto via a compression nut 60 and compression sleeve 62 assembly.

The above-described interconnect assembly 36 provides several benefits. First, the provision of a stepped orifice in the cylinder liner 12 reduces the port size in the cylinder liner 12, thereby reducing any adverse effects associated with the presence of a port in a cylinder 16. Further, the utilization of a high-temperature rubber gasket 58 between the first interconnect member 38 and the cylinder liner 12 substantially prevents the leakage of coolant from the water jacket into the cylinder 16 via the side port 34. Additionally, the provision of a two-piece interconnect assembly 36 allows for the easy removal of the side manifold 32 for repair, for replacement, or to eliminate the manifold altogether. Such elimination of the manifold could be accompanied by blocking of the side port 34 by, for example, threading an end cap (not shown) onto the first interconnect member 38 in place of the compression nut 60.

Figure 4:
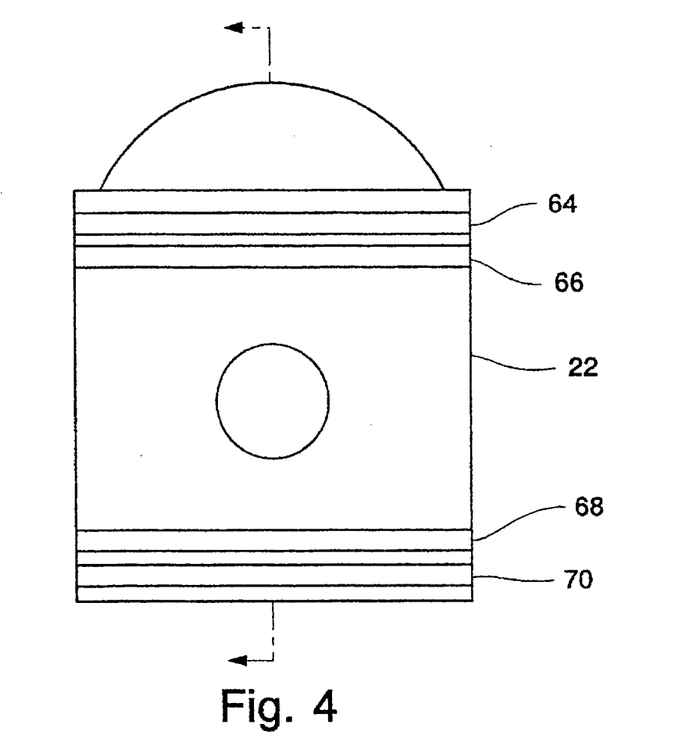
FIG. 4 is a side view of a piston embodying the present invention.
Figure 5:
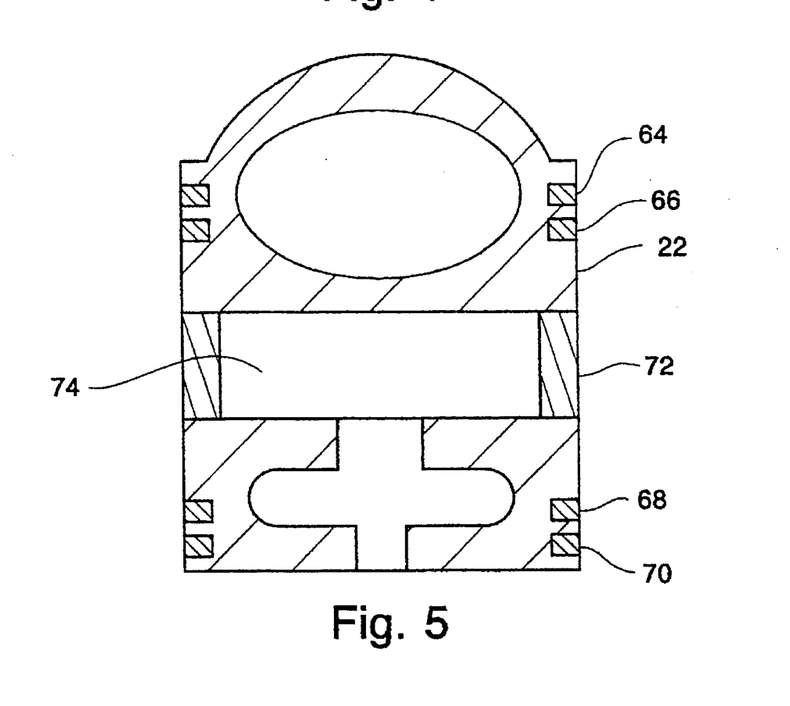
FIG. 5 is a sectional view of a piston taken along line 5—5 in FIG. 4.

The pistons 22 of the illustrated embodiment have been modified to account for the presence of the side ports 34 in the cylinder liners 12. Referring to FIGS. 4 and 5, the pistons 22 are provided with an upper compression ring 64 and an oil scraping ring 66 on an upper portion thereof. In addition, a lower compression ring 68 and an oil ring 70 are provided on a lower portion of each piston 22 to inhibit the leakage of pressurized gases through the side ports 34 and out the bottom of the pistons 22 and further to inhibit seepage of oil between the pistons 22 and the cylinder liners 12 and into the side ports 34 and side manifold 32. Each piston 22 is further provided with an end cap 72 positioned adjacent each end of the wrist pins 26 within the wrist pin holes 74 to inhibit leakage of pressurized gases from the side ports 34 and through the pistons 22 via the wrist pin holes 74. The end caps 72 comprise a high temperature material, such as high temperature plastic or metal. In the described embodiment, the end caps 72 comprise aluminum.

As best illustrated in FIGS. 6a–6g, the side ports 34 of the described embodiment are positioned about halfway between the bottom dead center ("BDC") position and the top dead center ("TDC") position of the pistons 22. That is, the side ports 34 are positioned about 50% of the stroke length above the BDC position of the pistons 22. It should be appreciated, however, that the positioning of the side ports 34 may vary depending on desired performance characteristics, engine parameters, and/or other variables. It is believed that the positioning of the side ports 34 may vary from about 25% to about 75% of the stroke length above the bottom dead center position while still obtaining the benefits of the present invention.

Figure 6A:
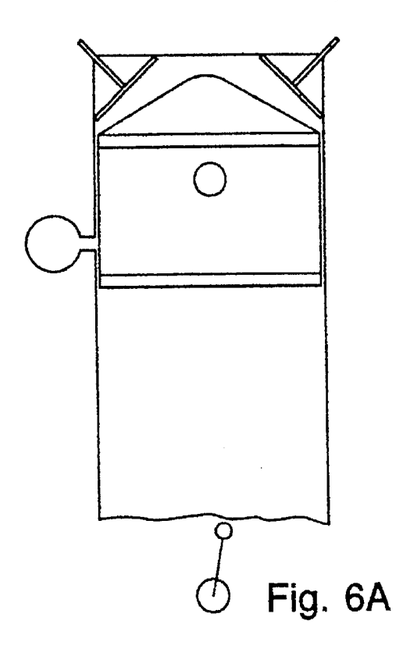
FIGS. 6a–6g are schematic side sectional views taken along line 6—6 in FIG. 2 illustrating a single cylinder of a four-cycle engine going through a complete combustion cycle.
Figure 6B:
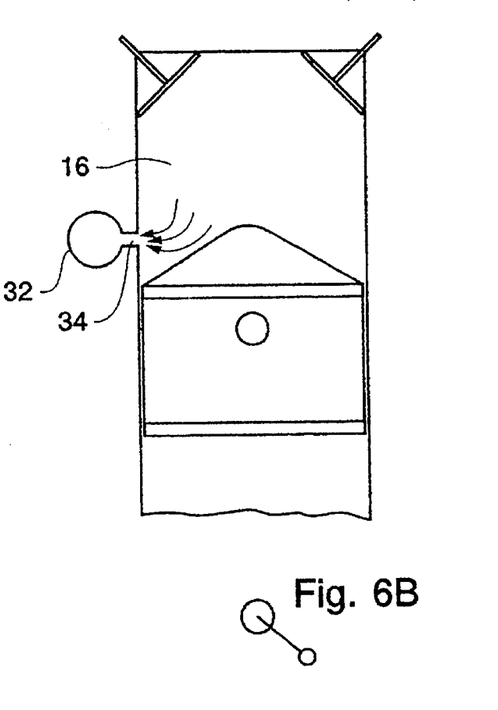
Figure 6C:
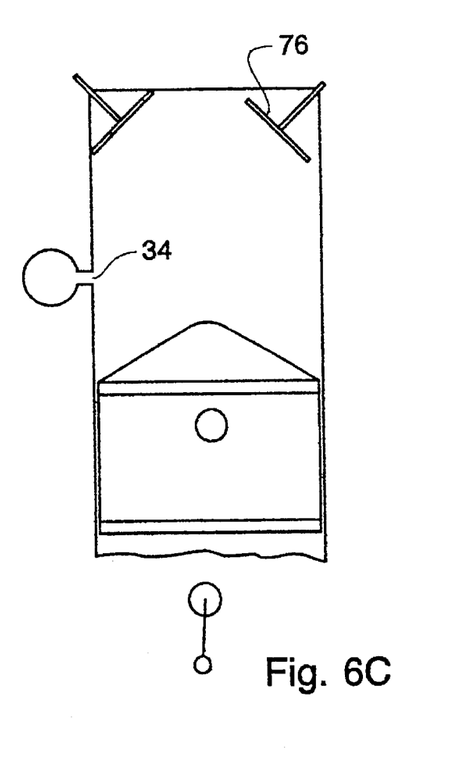
Figure 6D:
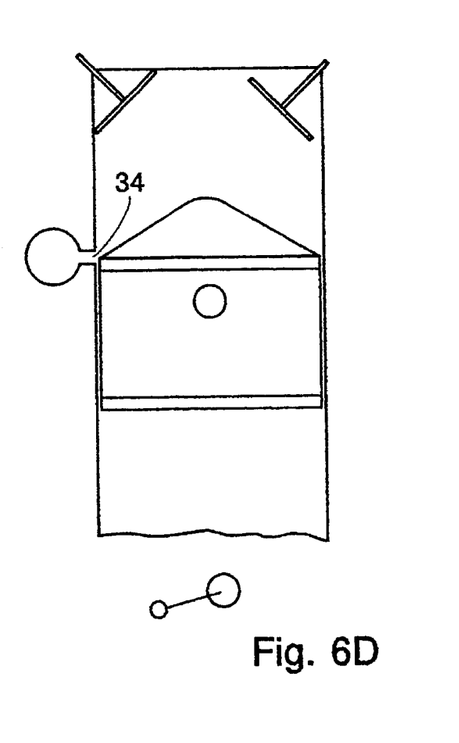
Figure 6E:
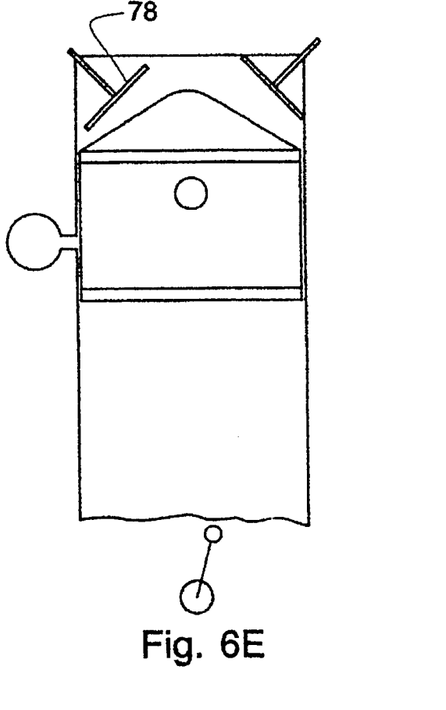
Figure 6F:
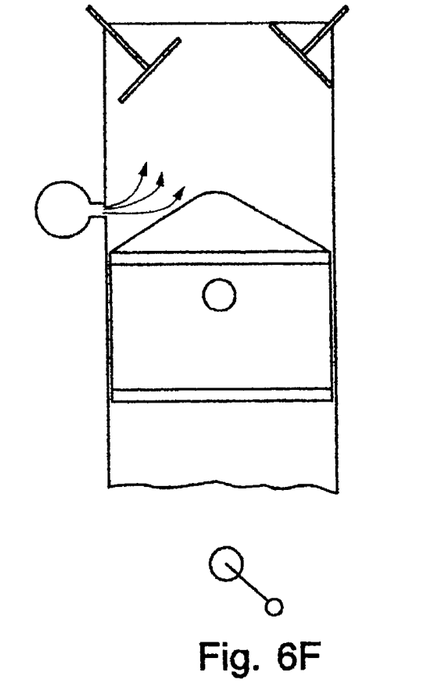
Figure 6G:
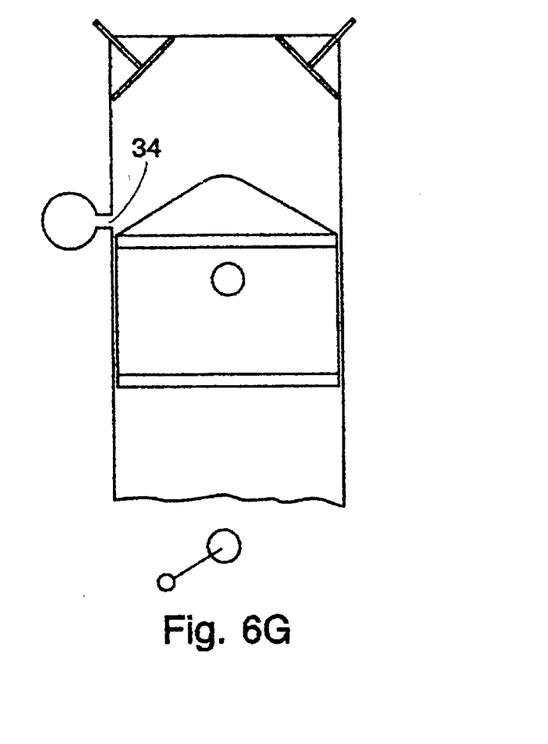

The operation of the above-described embodiment of the present invention is schematically illustrated in FIGS. 6a–6g. FIG. 6a illustrates a piston 22 about at the TDC position of its stroke, immediately before the power stroke. Upon combustion of the fuel contained therein, the pressure within the cylinder 16 increases and the piston 22 is forced downward. As the piston 22 travels below the side port 34, pressurized gases from the cylinder 16 is allowed to enter the side manifold 32 via the interconnect assembly 36 to thereby provide pressurized gases (e.g., partially combusted air/fuel mixture) to the side manifold 32 (FIG. 6b). As noted above, in the illustrated embodiment, such position is about 50% of the stroke length above the BDC position of the piston 22. Near the bottom of the power stroke, the exhaust valve 76 opens (FIG. 6c) and the piston 22 subsequently moves upwardly past the side port 34 to expel exhaust gases from the cylinder 16 and to seal at least some of the pressurized gases within the side manifold 32 (FIG. 6d). After the exhaust stroke, the exhaust valve 76 closes and the intake valve 78 opens to initiate the intake stroke (FIG. 6e). As the piston 22 travels downwardly, it sucks in a fresh air/fuel mixture and eventually passes below the side port 34 to allow the entrance of pressurized gases from the side manifold 32 and into the cylinder 16 (FIG. 6f). During the subsequent compression stroke, the piston 22 moves upwardly until the side port 34 is sealed, thereby trapping the pressurized gases in the cylinder 16 (FIG. 6g).

When utilized on a multi-cylinder engine 10, the timing of the cylinders is offset such that each cylinder 16 is at a different point in the combustion cycle, compared to the other cylinders. As such, the pressurized gas is provided to one cylinder 16 at the initiation of the compression stroke (FIG. 6f) is actually provided by a different cylinder 16 which is completing the power stroke (FIG. 6b). Utilizing such a device has been found to substantially improve the power output of the engine 10. It is believed that such increased power output is due to the increased compression obtained as a result of the pressurized gases provided by the side manifold 32 in a manner similar to that of a turbocharger or super-charger. With the side port 34 positioned at about 25% of the stroke length above the BDC, pressure within the side manifold 32 has been measured at about 6 psi at 6,000 rpm. In addition, because some of the exhaust gases are being recombusted, it is believed that more complete combustion will occur, thereby resulting in decreased emissions and improved fuel economy.

In an alternative embodiment of the present invention, the above-described engine 10 is provided with a means for injecting an expandable fluid, such as water, into the side manifold 32. Due to heat from the cylinders 16 of the engine 10, water injected into the side manifold 32 will turn to steam and pressurize the side manifold 32 above and beyond the pressure which can be obtained without the utilization of water injection. Such increase in pressure within the side manifold 32 is believed to significantly increase the power output of the engine 10 in a manner similar to that of a turbo-charger or super-charger. In addition, steam injection has been found to reduce accumulation of carbon deposits within the combustion chamber and also may reduce emission of nitrogen oxides. The close proximity of the side manifold 32 to the engine 10 allows heat to be transferred from the engine 10 to the side manifold 32 to facilitate vaporization of the expandable fluid.

Figure 7:
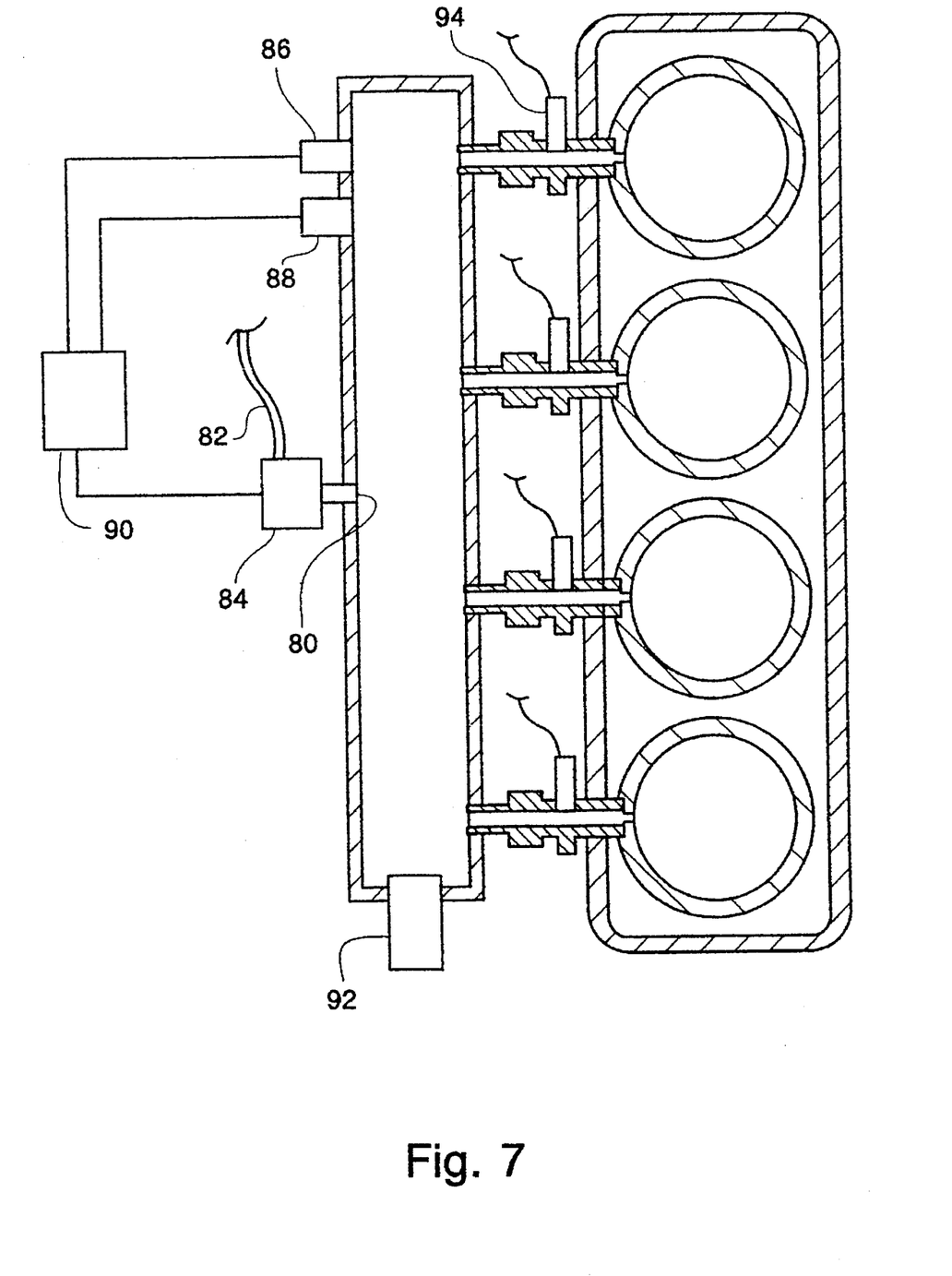
FIG. 7 is a top sectional view of a four-cylinder engine illustrating an alternative embodiment of the present invention.

In one embodiment, illustrated in FIG. 7, the means for injecting includes an injector nozzle 80 mounted in the sidewall of the side manifold 32. Depending on the fluid injection rate and spray characteristics, many different types of injector nozzles 80 may be utilized. For example, fuel injection nozzles 80 manufactured by Bosch may be utilized. The injector nozzle 80 is interconnected with a water reservoir (not shown) via a water supply line 82. A water pump (not shown) is utilized to maintain a relatively constant pressure within the water supply line 82.

An electronic control valve 84 is positioned within the water supply line 82 to regulate the amount of water being injected into the side manifold 32. In the illustrated embodiment, the control valve 84 is a solenoid-type valve which selectively opens and closes the pathway to the injector nozzle 80. The control valve 84 is activated and deactivated by a pressure-control circuit comprising a pressure sensor 86, a temperature sensor 88 and an electronic control mechanism 90. The electronic control mechanism 90 monitors the temperature and pressure within the side manifold 32 and selectively activates and deactivates the control valve 84 depending on the pressure and temperature parameters. In the illustrated embodiment, for example, the control mechanism 90 comprises a switching mechanism that maintains the control valve 84 closed (i.e., no water being injected through the injector nozzle 80) if the temperature within the side manifold 32 is below a predetermined value, such as about 200° F. and preferably about 300° F. In addition, the switching mechanism of the illustrated embodiment is designed to maintain the pressure within the side manifold 32 at about 11 psi. Accordingly, if the pressure within the side manifold 32 falls below 11 psi, water will be injected until the pressure is above 11 psi (i.e., assuming the appropriate temperature is present within the side manifold 32). A pressure range, such as 9–13 psi, may be utilized as the control window.

As a safety mechanism, the side manifold 32 may be provided with a pressure relief valve 92 which limits the maximum pressure within the side manifold 32 by releasing steam therethrough. For example, in the illustrated embodiment, the pressure relief valve 92 is designed to allow steam to exit the side manifold 32 if the pressure within the side manifold 32 exceeds a predetermined value, such as about 300 psi and preferably about 500 psi.

Instead of pure water, the fluid supplied to the side manifold 32 through the injector nozzle 80 may comprise a mixture of water and alcohol. The addition of alcohol decreases the freezing point of water, thereby inhibiting freezing of the water at low temperatures. In addition, the alcohol can combust and act as a fuel. In the described embodiment, the fluid injected into the side manifold 32 comprises a 10:1 ratio of water to ethyl alcohol. It should be appreciated that other types of alcohol could also be utilized, as well as other mixing ratios.

In order to provide adequate heat for vaporization of the fluid being supplied to the side manifold 32, the side manifold 32 may advantageously be positioned adjacent the exhaust conduit (not shown) of the engine 10. The exhaust conduit carries exhaust gases from the exhaust valves 76 of the engine 10 to the external environment and are typically at temperatures of from about 300° F. to about 1500° F. By positioning the side manifold 32 adjacent to, and in heat transfer relationship with, the exhaust conduit, some of the heat from the exhaust gases will be transferred to the side manifold 32 to enhance the vaporization of fluid supplied to the side manifold 32. Preferably, the side manifold is maintained at a temperature of at least about 300° F., and more preferably at least about 1000° F.

In yet another embodiment, the interconnect assemblies 36 are provided with controllable side valves 94 for selectively opening and closing the passageways between the side manifold 32 and the cylinders 16. The side valves 94 are preferably solenoid-type valves and are operatively connected to a valve control mechanism (not shown). The valve control mechanism is programmed to selectively open and close the side valves 94 depending on certain engine parameters. For example, in the described embodiment, the ports are maintained closed when the engine 10 is running at 1500 rpm or less. This feature prevents the pressure within the side manifold 32 (which may actually be a vacuum at low engine speeds) from adversely affecting the idle circuit. In addition, the side valves 94 of the described embodiment are maintained closed if the pressure within the side manifold 32 exceeds a predetermined pressure, such as about 35 psi. When alternative fuels, such as propane, natural gas, butane, acetylene, etc., are used, it is believed that the maximum side manifold pressure could be at least about 50 psi. This feature prevents excessive pressure being injected into the cylinders 16 and possibly causing damage to the engine 10.

Figure 8A:
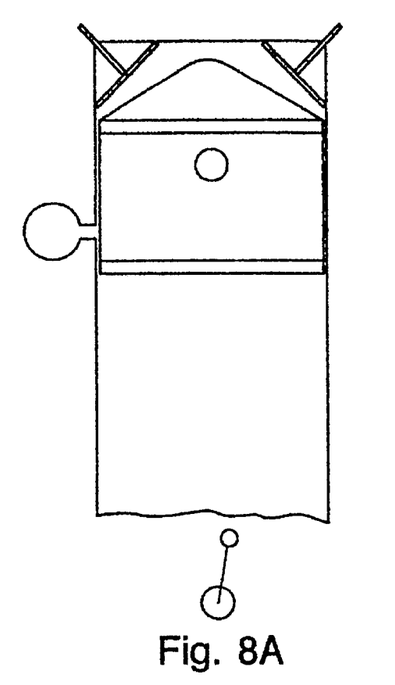
FIGS. 8a–8c are schematic side sectional views illustrating another embodiment of the present invention.
Figure 8B:
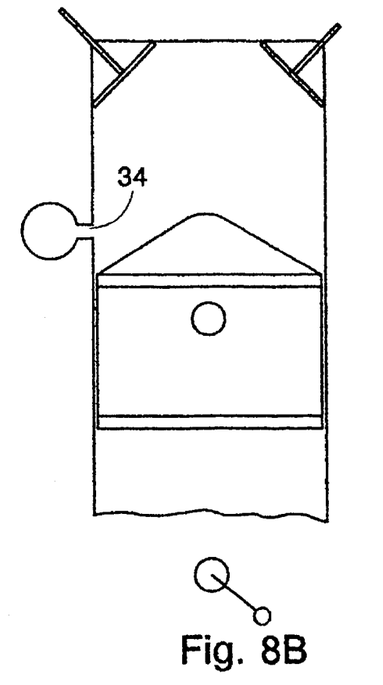
Figure 8C:
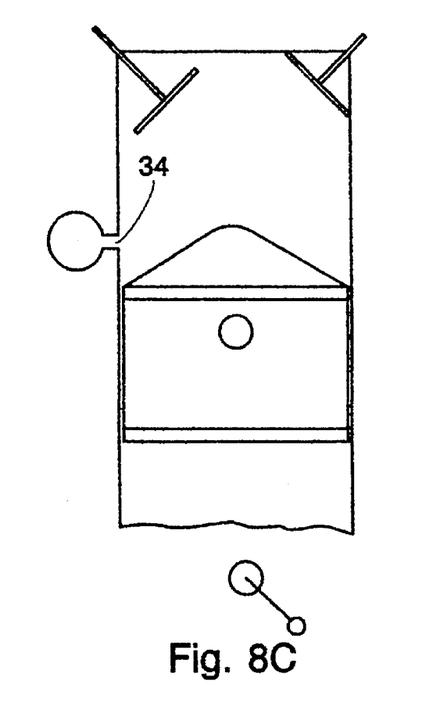

When the engine speed is above 1500 rpm and the pressure within the side manifold 32 is at or below 35 psi, the side valves 94 of the described embodiment are opened and closed in the following manner. At the initiation of the power stroke (FIG. 8a), the side valve 94 is closed. As the piston 22 travels below the side port 34, the side valve 94 is opened to allow pressurized gas from the cylinder 16 to enter the side manifold 32 via the interconnect assembly 36 to thereby provide pressurized gas to the manifold (FIG. 8b). When the piston 22 has travelled about 85% of its stroke length from the TDC position, the valve is closed to lock the pressure within the side manifold 32. The side valve 94 remains closed throughout the subsequent exhaust stroke. During the subsequent intake stroke, the side valve 94 is reopened when the piston 22 travels below the side port 34, about 50% of the stroke length from TDC position in the illustrated embodiment. Such opening of the side valve 94 allows pressurized gas to pass from the side manifold 32 and into the cylinder 16 (FIG. 8c). Similar to the power stroke, the side valve 94 is closed at about 85% of the intake stroke. The above-described side valves 94 may be utilized with or without the utilization of fluid injection into the side manifold 32. The above-described control of the side valves is facilitated by operative interconnection between the valve control mechanism and the timing system of the engine (e.g., utilizing mechanical or electronic read-outs from the crank shaft or cams).

In some situations, it may be desirable to have manual control over the actuation of the side valves 94. Accordingly, in one embodiment, a manual shut-off switch is operatively interconnected with the side valves 94 to provide for manual deactivation of the side valves 94, thereby placing each of the side valves 94 in the closed position. Such ability to manually close the side valves 94 may be useful when, for example, performing diagnostics on the engine 10.

Since the side valves 94 of the described embodiment are actuated utilizing electronic solenoids, it is important that a reliable source of relatively constant voltage be provided. Without a source of relatively constant voltage, the solenoids may not properly function, thereby inhibiting proper performance of the engine. Accordingly, in another embodiment, a voltage sensor (not shown) is operatively interconnected with the solenoids to detect the amount of voltage being provided to the solenoids. If the voltage falls below or exceeds predetermined values, the voltage sensor will direct all solenoids to close the corresponding side valves 94 so that the engine 10 can perform as a standard combustion engine. For example, in the described embodiment, the solenoids are designed to function utilizing a 12 volt source. The corresponding voltage sensor is designed to close the side valves 94 if the voltage source falls below 10 volts or exceeds 15 volts.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A combustion engine comprising:
    an engine block defining a combustion chamber having a side port in a sidewall thereof, said side port being positioned between about 25% and about 75% of a piston's stroke length;
    a movable member movable relative to and within said combustion chamber to intermittently cover and uncover said side port;
    a hollow member positioned adjacent said engine block and defining a pressure chamber, said pressure chamber having no valve to control the bidirectional flow of exhaust gas; and
    interconnect means for interconnecting said pressure chamber with said side port of said combustion chamber, said interconnect means allowing bidirectional flow of exhaust gas between said pressure chamber and said combustion chamber.

2. A combustion engine, as claimed in claim 1, further comprising means for heating said pressure chamber.

3. The combustion engine of claim 1, further comprising means for providing expandable fluid to said pressure chamber, whereby said expandable fluid will pressurize said pressure chamber upon being provided thereto.

4. A combustion engine, as claimed in claim 3, wherein said expandable fluid is selected from the group consisting of water and steam.

5. A combustion engine, as claimed in claim 3, wherein said expandable fluid comprises a combustible fuel.

6. A combustion engine, as claimed in claim 5, wherein said expandable fluid comprises an alcohol.

7. A combustion engine, as claimed in claim 1, wherein said combustion chamber comprises a cylinder.

8. A combustion engine, as claimed in claim 1, wherein said movable member comprises a piston.

9. A combustion engine, as claimed in claim 1, wherein said engine block defines at least two combustion chambers, and wherein said interconnect means interconnects said pressure chamber with each of said combustion chambers.

10. A combustion engine, as claimed in claim 1, wherein said combustion engine is a four-stroke engine.

11. A combustion engine, as claimed in claim 1, wherein said interconnect means comprises valve means for intermittently opening and closing said interconnect means.

12. A combustion engine comprising:
 an engine block defining a combustion chamber having a side port in a sidewall thereof, said engine being a four-stroke engine;
 a movable member movable relative to and within said combustion chamber to intermittently cover and uncover said side port;
 a hollow member positioned adjacent said engine block and defining a pressure chamber;
 interconnect means for interconnecting said pressure chamber with said side port of said combustion chamber, said interconnect means allowing bidirectional flow of exhaust gas between said pressure chamber and said combustion chamber; and
 means for heating said pressure chamber.

13. A combustion engine, as claimed in claim 12, wherein said movable member comprises a piston and said combustion chamber comprises a cylinder, and wherein said piston is movable relative to said cylinder from a bottom position to a top position thereby defining a stroke length, said side port being positioned between about 25% and about 75% of said stroke length from said bottom position.

14. A combustion engine, as claimed in claim 12, wherein said means for heating said pressure chamber comprises an exhaust duct positioned in heat transfer relationship to said pressure chamber.

15. A combustion engine, as claimed in claim 12, wherein said pressure chamber is at a temperature of at least about 200° F. during at least a portion of operation of said combustion engine.

16. A combustion engine, as claimed in claim 12, wherein said combustion chamber comprises a cylinder.

17. A combustion engine, as claimed in claim 12, wherein said movable member comprises a piston.

18. A combustion engine, as claimed in claim 12, wherein said engine block defines two combustion chambers, and wherein said interconnect means interconnects said pressure chamber with each of said combustion chambers.

19. A combustion engine comprising:
 an engine block defining at least two cylinders each having a side port in a sidewall thereof;
 at least two pistons, each said piston being movable relative to and within one of said two cylinders from a bottom position to a top position thereby defining a stroke length, said side ports being positioned between about 25% and about 75% of said stroke length from said bottom position;
 a pressure manifold operatively positioned within said engine block and defining a pressure chamber, said engine block providing heat to said pressure chamber; and
 interconnect means for interconnecting said pressure chamber with each of said side ports of said cylinders, said interconnect means allowing bidirectional flow of exhaust gas between said pressure chamber and said cylinders, wherein said interconnect means provides pressurized gases to said manifold causing recombustion of exhaust gas, thereby resulting in decreased emissions and improved fuel economy.

20. A combustion engine, as claimed in claim 19, further comprising means for providing expandable fluid to said pressure manifold, whereby said expandable fluid will expand and pressurize said pressure chamber upon being provided thereto.

21. A combustion engine, as claimed in claim 19, further comprising means for heating said pressure chamber.

22. A combustion engine, as claimed in claim 19, wherein said side ports are positioned between about 35% and about 65% of said stroke length from said bottom position.

23. A combustion engine, as claimed in claim 22, wherein said side ports are positioned about 50% of said stroke length from said bottom position.

24. A combustion engine, as claimed in claim 19, wherein said combustion engine is a four-stroke engine.

25. A combustion engine, as claimed in claim 19, wherein said pistons each comprise a wrist pin, positioned within an aperture, and at least one end cap positioned within the aperture.

26. A combustion engine comprising:
 an engine block defining at least two cylinders each having a side port in a sidewall thereof;
 at least two pistons each movable relative to and within one of said two cylinders from a bottom position to a top position thereby defining a stroke length, said side ports being positioned between about 25% and about 75% of said stroke length from said bottom position;
 a pressure chamber associated with said engine block whereby heat from said engine block is provided to said pressure chamber, said pressure chamber having no valve to control the bidirectional flow of exhaust gas;
 interconnect means for interconnecting said pressure chamber with each of said side ports of said cylinders, said interconnect means allowing bidirectional flow of exhaust gas between said pressure chamber and said cylinders;
 means for heating said pressure chamber; and
 means for providing expandable fluid to said pressure chamber, whereby said expandable fluid will expand and pressurize said pressure chamber upon being provided thereto.

27. A combustion engine comprising:
 an engine block having at least two pistons movable within at least two cylinders between a bottom position and a top position thereby defining a stroke length;
 at least two combustion chambers defined by each of said cylinders and pistons;
 a side port positioned at about 25%–75% between said bottom portion and said top portion of said stroke length, said side port intermittently opened and closed by each of said piston moving within each of said cylinders;
 a pressure chamber operatively positioned within said engine block to provide heat from said engine block to said pressure chamber; and
 interconnect means for interconnecting said pressure chamber with each of said side ports of said cylinders, said interconnect means allowing the bidirectional flow of exhaust gas between said pressure chamber and said combustion chambers, wherein said exhaust gas is provided to one of said two cylinders at the initiation of a compression stroke by other said cylinder completing a power stroke.

28. A combustion engine comprising:
 an engine block defining a combustion chamber having a side port in a sidewall thereof;

a movable member movable relative to and within said combustion chamber to intermittently cover and uncover said side port;

a hollow member positioned adjacent said engine block and defining a pressure chamber; and interconnect means for interconnecting said pressure chamber with said side port of said combustion chamber, said interconnect means allowing bidirectional flow of exhaust gas between said pressure chamber and said combustion chamber, said expandable fluid selected from the group consisting of water and steam.

29. A combustion engine comprising:

an engine block defining a combustion chamber having a side port in a sidewall thereof;

a movable member movable relative to and within said combustion chamber to intermittently cover and uncover said side port;

a hollow member positioned adjacent said engine block and defining a pressure chamber; and interconnect means for interconnecting said pressure chamber with said side port of said combustion chamber, said interconnect means allowing bidirectional flow of exhaust gas between said pressure chamber and said combustion chamber, said expandable fluid comprising a combustible fuel.

30. A combustion engine comprising:

an engine block defining a combustion chamber having a side port in a sidewall thereof;

a movable member movable relative to and within said combustion chamber to intermittently cover and uncover said side port;

a hollow member positioned adjacent said engine block and defining a pressure chamber; and interconnect means for interconnecting said pressure chamber with said side port of said combustion chamber, said interconnect means allowing bidirectional flow of exhaust gas between said pressure chamber and said combustion chamber, said combustible fuel comprising an alcohol.

31. A combustion engine comprising:

an engine block defining at least two cylinders each having a side port in a sidewall thereof;

at least two pistons, each said piston being movable relative to and within one of said two cylinders from a bottom position to a top position thereby defining a stroke length, said side ports being positioned between about 25% and about 75% of said stroke length from said bottom position;

a pressure manifold positioned adjacent said engine block and defining a pressure chamber; and interconnect means for interconnecting said pressure chamber with each of said side ports of said cylinders, said interconnect means allowing bidirectional flow of exhaust gas between said pressure chamber and said cylinders, wherein said combustion engine is a four-stroke engine.

* * * * *